(12) United States Patent
Galliano et al.

(10) Patent No.: US 10,539,011 B2
(45) Date of Patent: Jan. 21, 2020

(54) DETERMINING DRILLING FLUID LOSS IN A WELLBORE

(71) Applicant: Halliburton Energy Services, Inc., Houston, TX (US)

(72) Inventors: Clinton Cheramie Galliano, Houma, LA (US); Mathew Dennis Rowe, Lafayette, LA (US); Walter Varney Andrew Graves, Lafayette, LA (US)

(73) Assignee: Halliburton Energy Services, Inc., Houston, TX (US)

( * ) Notice: Subject to any disclaimer, the term of this patent is extended or adjusted under 35 U.S.C. 154(b) by 95 days.

(21) Appl. No.: 15/539,803

(22) PCT Filed: Feb. 27, 2015

(86) PCT No.: PCT/US2015/018011
§ 371 (c)(1),
(2) Date: Jun. 26, 2017

(87) PCT Pub. No.: WO2016/137493
PCT Pub. Date: Sep. 1, 2016

(65) Prior Publication Data
US 2017/0370211 A1 Dec. 28, 2017

(51) Int. Cl.
*E21B 47/10* (2012.01)
*E21B 47/12* (2012.01)
(Continued)

(52) U.S. Cl.
CPC ........ *E21B 47/122* (2013.01); *E21B 47/1015* (2013.01); *G06K 19/0725* (2013.01); *E21B 43/261* (2013.01); *E21B 47/01* (2013.01)

(58) Field of Classification Search
CPC .................................................. E21B 47/1015
(Continued)

(56) References Cited

U.S. PATENT DOCUMENTS 6,898,529 B2 * 5/2005 Gao ...................... E21B 43/26
702/11
6,995,677 B2 2/2006 Aronstam et al.
(Continued)

FOREIGN PATENT DOCUMENTS

WO 2011021053 2/2011
WO 2012156730 11/2012
(Continued)

OTHER PUBLICATIONS

Belgium Patent Application No. 2016/5059, "Extended Search Report and Written Opinion", dated Jan. 25, 2016, 14 pages (No English translation available. A summary of the Extended Search Report is provided in the Transmittal Letter submitted herewith).
(Continued)

*Primary Examiner* — Taras P Bemko
(74) *Attorney, Agent, or Firm* — Kilpatrick Townsend & Stockton LLP

(57) ABSTRACT

A location of a fracture can be determined in a wellbore. Micro-electro-mechanical ("MEM") devices of different sizes and shapes can be included in a sweep and injected into a wellbore. A MEM reader can be positioned within a downhole tool for detecting MEM devices in the wellbore after a sweep returns to the surface of the wellbore. The MEM reader can be disposed in the wellbore for measuring the position of the MEM devices remaining in the wellbore. A location, size, and shape of a fracture in the wellbore can be determined based on the position of the MEM devices in the wellbore.

17 Claims, 9 Drawing Sheets

(51) Int. Cl.
  *G06K 19/07* (2006.01)
  *E21B 43/26* (2006.01)
  *E21B 47/01* (2012.01)

(58) Field of Classification Search
  USPC .................................................. 166/250.1
  See application file for complete search history.

(56) References Cited

U.S. PATENT DOCUMENTS

| | | |
|---|---|---|
| 7,017,662 B2 | 3/2006 | Schultz et al. |
| 7,082,993 B2 | 8/2006 | Ayoub et al. |
| 7,712,527 B2 | 5/2010 | Roddy |
| 7,950,451 B2 | 5/2011 | Alberty |
| 8,162,050 B2 | 4/2012 | Roddy et al. |
| 2003/0144153 A1* | 7/2003 | Kirsner .................. C09K 8/32 507/100 |
| 2005/0055162 A1 | 3/2005 | Gao et al. |
| 2008/0007421 A1 | 1/2008 | Liu et al. |
| 2009/0087912 A1 | 4/2009 | Ramos et al. |
| 2009/0211754 A1 | 8/2009 | Verret et al. |
| 2010/0051266 A1 | 3/2010 | Roddy et al. |
| 2010/0139386 A1 | 6/2010 | Taylor |
| 2011/0133368 A1 | 6/2011 | Ringeisen et al. |
| 2011/0155368 A1 | 6/2011 | El-Khazindar et al. |
| 2011/0192592 A1 | 8/2011 | Roddy et al. |
| 2012/0273192 A1 | 11/2012 | Schmidt et al. |
| 2014/0111349 A1 | 4/2014 | Roberson et al. |

FOREIGN PATENT DOCUMENTS

| | | |
|---|---|---|
| WO | 2015030755 | 3/2015 |
| WO | 2016108829 | 7/2016 |
| WO | 2016108850 | 7/2016 |

OTHER PUBLICATIONS

International Patent Application No. PCT/US2015/018011, "International Search Report and Written Opinion", dated Nov. 16, 2015, 17 pages.

\* cited by examiner

DETERMINING DRILLING FLUID LOSS IN A WELLBORE

TECHNICAL FIELD

The present disclosure relates generally to wellbore drilling. More specifically, but not by way of limitation, this disclosure relates to using micro-electro-mechanical ("MEM") devices to determine a location of a fracture in a wellbore through which drilling fluid is lost.

BACKGROUND

A well system (e.g., oil or gas wells for extracting fluids from a subterranean formation) can include a drilling rig for drilling in a wellbore, along with other components or equipment. During drilling, fluid from the drilling operation, such as drilling fluid or drilling mud, can be lost into fractures in the wellbore, which can involve costs and delays in completing the drilling process.

DETAILED DESCRIPTION

Figure 1:
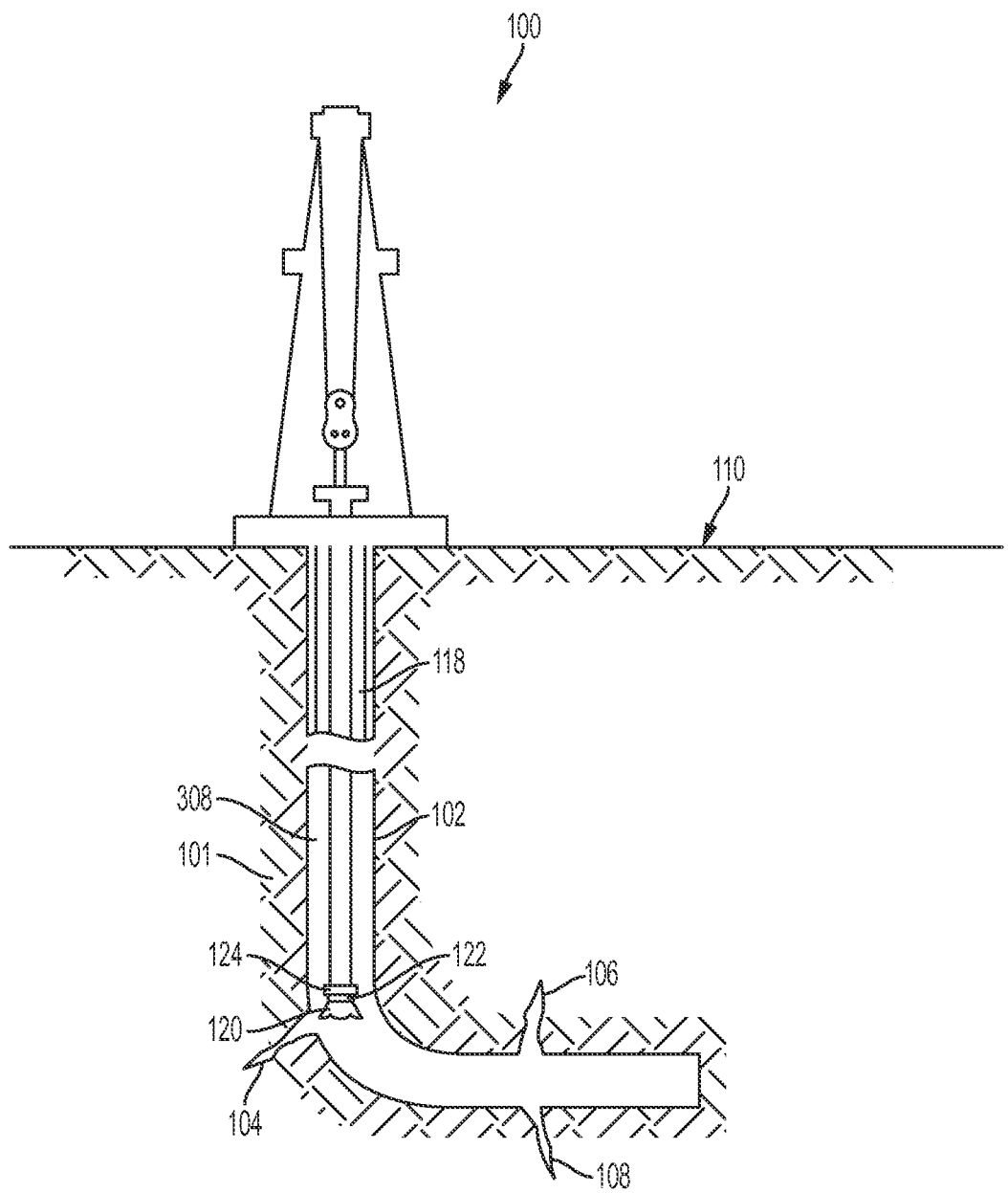
FIG. 1 is a schematic diagram of a drilling rig on a wellbore with fractures according to one example of the present disclosure.

Certain aspects and features of the present disclosure are directed to detecting micro-electro-mechanical ("MEM") devices embedded in a fracture in a wellbore that is losing fluid. During drill rig operations, the drilling fluid circulation system or mud system circulates drilling fluid or mud through the wellbore. As the fluid circulates through the wellbore, some fluid can be lost to fractures in the wellbore formation. The fractures can be pre-existing fractures in the wellbore or can be fractures induced during drilling operations. Efficiently locating fractures in the wellbore can lead to effective treatment of the fracture using techniques such as performing loss-circulation-materials ("LCM") sweeps, using scab casings or scab liners, or applying cement to seal the fracture. Determining the size and shape of the fracture can also expedite well treatment efforts. The location, size, or shape of a fracture may be determined using a MEM reader and MEM devices of different sizes and shapes. The location of MEM devices remaining in a wellbore, after being injected in the wellbore in a sweep, may be representative of the location of a fracture in the wellbore. Also, the sizes and shapes of the MEM devices in the wellbore may be representative of the size and shape of the fracture.

For example, a quantity and types of MEM devices (e.g., devices with radio frequency identification ("RFID") tags) of different sizes, shapes, and densities may be placed in a sweep for a wellbore that is losing fluid. After the sweep returns to the surface of the wellbore, a downhole tool for gathering and transmitting information about the wellbore (e.g., a measuring-while-drilling ("MWD") tool, a logging-while-drilling ("LWD") tool, or a wireline), along with a MEM reader (e.g., an RFID tag reader) can be run into the wellbore hole. As the downhole tool and MEM reader are run downhole, the MEM reader can detect individual MEM devices, or a group of MEM devices, remaining in the wellbore after the sweep returns to the surface of the wellbore. The MEM reader can transmit this data to a computing device. The MEM reader can also detect a position of the MEM devices in the wellbore and transmit this data to the computing device. In other examples, depth of the downhole tool and MEM reader in the wellbore may be tracked and transmitted to the computing device (e.g., by using the downhole tool to keep track of drilling depth). The depth of the downhole tool and MEM reader in the wellbore may indicate the location in the wellbore where the MEM reader detects MEM devices. The computing device can output the data received from the MEM reader for determining a location of a fracture in the wellbore.

The computing device may also generate a distribution of the number of MEM devices of each type detected in the wellbore and output this data for determining a size, shape, and type of the fracture. The computing device may also generate and output data about the amount and types of MEM devices detected in the wellbore for determining an amount and types of LCM to be used in a subsequent sweep for treating the fracture. The computing device may also output data received from the MEM reader for determining a distribution of fractures in the wellbore and for determining remedial actions for well planning.

Determining the location, size, or shape of a fracture in a wellbore that is losing fluid can enhance the drilling operations on a wellbore. For example, efficiently locating a fracture in the wellbore and determining the fracture's features can lead to effective treatment of the fracture, expedite well treatment efforts and can help prevent substantial loss of drilling fluid.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

FIG. 1 is a schematic diagram of a drilling rig 100 on a wellbore 102 with fractures according to one example of the present disclosure. In this example, drilling rig 100 is depicted for a well system (e.g., an oil or gas well for extracting fluids from a subterranean formation 101). The drilling rig 100 may be used to create a hole or wellbore 102 in the surface 110. The drilling rig includes a well tool or downhole tool 118, and a drill bit 120. The downhole tool 118 can be any tool used to gather information about the wellbore. For example, the downhole tool 118 can be a tool delivered downhole by wireline, often referred to as wireline formation testing ("WFT"). Alternatively, the downhole tool 118 can be a tool for either measuring-while-drilling or logging-while-drilling. The downhole tool 118 can include a sensor component 122 for determining information about the wellbore 102 (e.g., drilling parameters). The downhole tool 118 can also include a transmitter 124 for transmitting data (e.g., from the sensor component 122) to the surface of the well system. The downhole tool 118 can further include a drill bit 120 for drilling the wellbore 102.

The wellbore 102 has been drilled from a surface 110 and through subterranean formation 101. As the wellbore 102 is drilled, drilling fluid can be pumped through the drill bit 120 and into the wellbore 102 to enhance drilling operations. As the drilling fluid enters into the wellbore, the drilling fluid circulates back toward the surface 110 through a wellbore annulus 308—the space between the drill bit 120 and the wellbore 102. A fracture in the wellbore formation such as fracture 104, 106, or 108 may cause a loss of drilling fluid leading to a loss of circulation of the drilling fluid. The fracture 104, 106, or 108 may be of natural origin or may be created during drilling operations. For example, fractures in the wellbore may be induced by increasing the pressure of the drilling fluid until the surrounding formation fails in tension and a fracture is induced.

Figure 2:
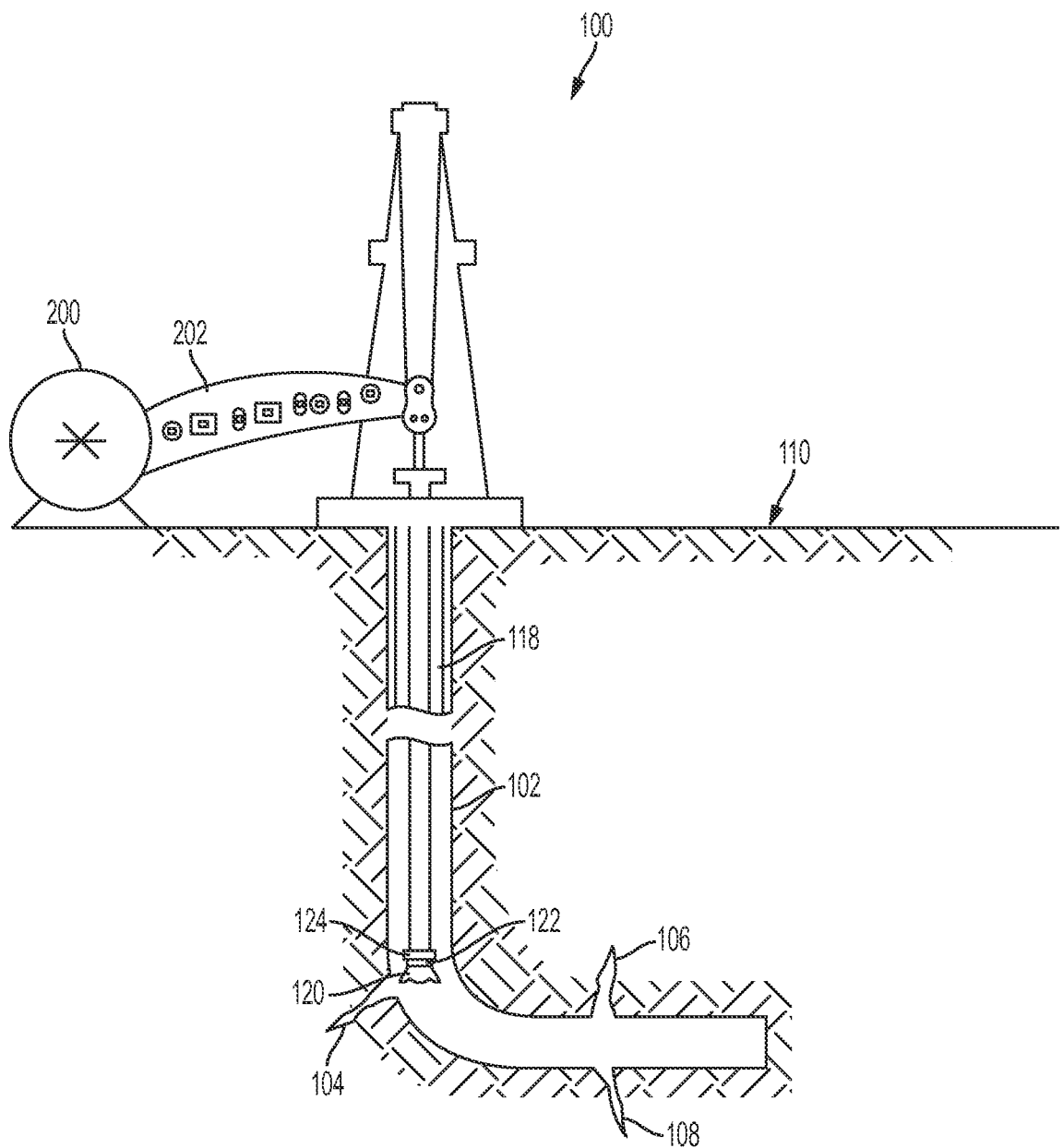
FIG. 2 is a schematic diagram of a wellbore with fractures, along with a pump and micro-electro-mechanical ("MEM") devices of different sizes and shapes according to one example of the present disclosure.

In other examples, the drilling rig 100 may include other equipment for use on the wellbore during drilling operations. For example, FIG. 2 is a schematic diagram of a wellbore 102 with fractures, along with a pump 200 and MEM devices 202 of different sizes and shapes entering the wellbore according to one example of the present disclosure.

In this example, the drilling rig 100 can also include a pump 200. The pump 200 can pump a variety of drilling compositions, such as drilling fluid or drilling mud, to the drill bit 120 through which the drilling fluid exits into the wellbore 102. In some examples, the pump can be used to pump a sweep into the wellbore. The sweep may contain MEM devices 202 of different shapes and sizes. In other examples, the sweep may also contain LCM for well treatment.

Figure 3:
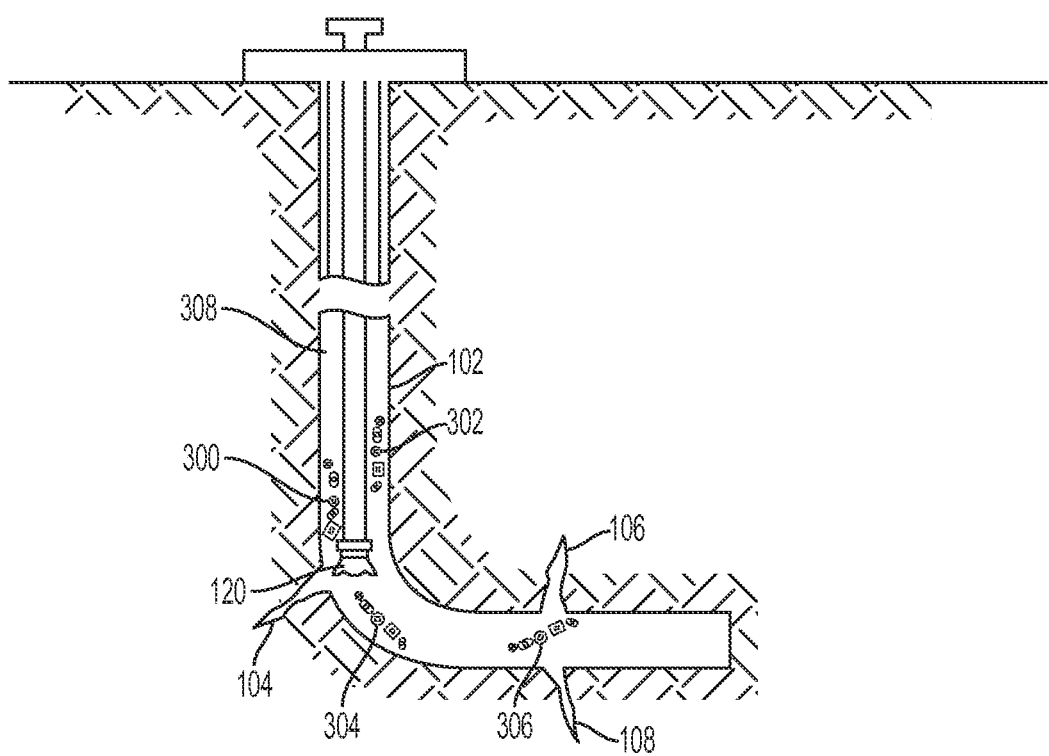
FIG. 3 is a schematic diagram of a wellbore with fractures, along with MEM devices of different sizes and shapes along the wellbore annulus according to one example of the present disclosure.

FIG. 3 is a schematic diagram of a wellbore 102 with fractures, along with MEM devices of different sizes and shapes along the wellbore annulus 308 according to one example of the present disclosure.

In this example, MEM devices of different sizes and shapes can be injected into the wellbore 102 along with a sweep for the wellbore. The MEM devices can enter the wellbore 102 through a drill bit 120. As the MEM devices flow with the sweep into the wellbore 102, groups 300, 302, 304, 306 of MEM devices may collect and flow along the wellbore annulus 308. As the MEM devices flow along the wellbore annulus 308, a group of MEM devices may become embedded in fractures 104, 106, 108, depending on the shapes and sizes of the individual MEM devices in the group. In some examples, a location of a group of MEM devices in the wellbore may correspond to a location of a fracture in the wellbore based on the presence of the group of MEM devices at a position in the wellbore. In other examples, the shapes and sizes of the MEM devices at a position in the wellbore may be representative of the shape and size of a fracture in the wellbore.

Figure 4:
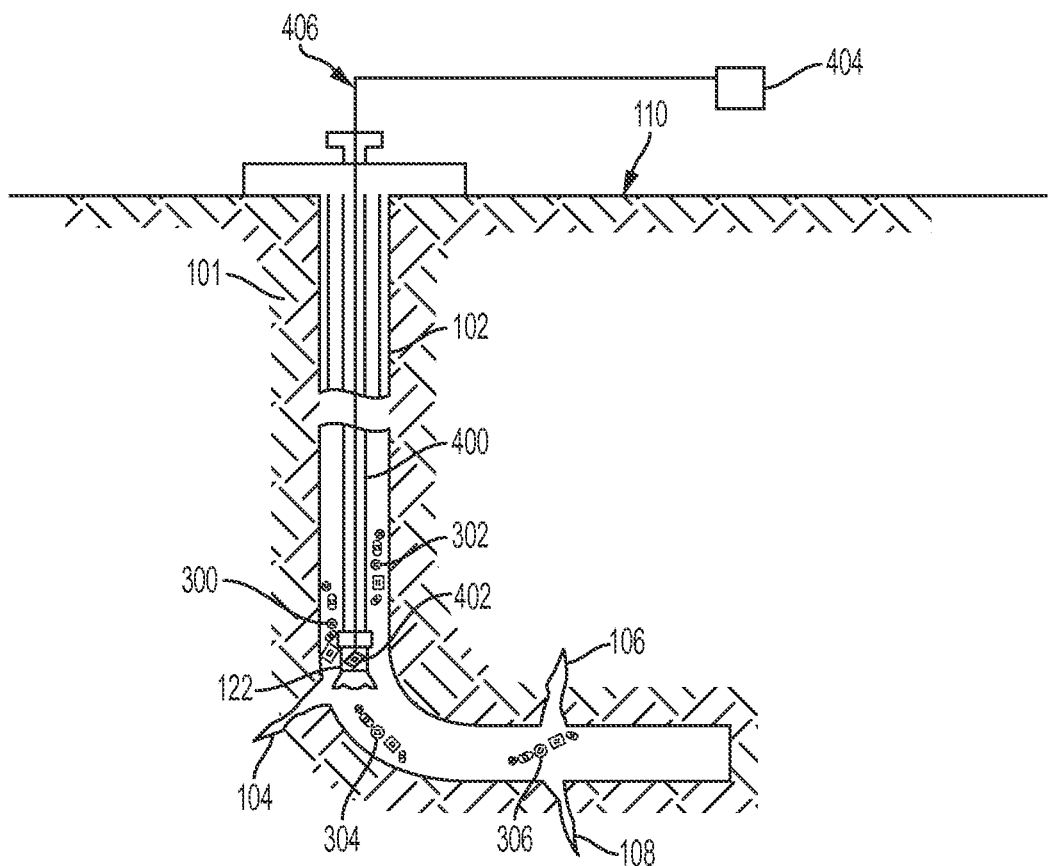
FIG. 4 is a schematic diagram of a wellbore with fractures, and groups of MEM devices, along with a logging-while-drilling ("LWD") tool, a MEM reader, and a computing device according to one example of the present disclosure.

FIG. 4 is a schematic diagram of a wellbore 102 with fractures, and groups of MEM devices, along with LWD tool 400, a MEM reader 402, and a computing device 404 according to one example of the present disclosure.

In this example, LWD tool 400 can be any type of well logging tool that can be used to log, interpret and transmit real-time data about the wellbore to a surface 110 of the wellbore during drilling operations. For example, the LWD tool 400 may include a sensor component 122 that may be used to measure physical properties of the subterranean formation 101 through which the wellbore 102 is formed. The LWD tool 400 may also be used for measuring and storing data corresponding to the drilling depth of the wellbore 102 or the depth or location of the LWD tool within the wellbore 102. In other examples, LWD tools can be used to provide information on porosity, resistivity, acoustic waveform, hole direction, and weight on a drill bit. The information measured by the LWD tool 400 may be stored in the LWD tool 400 for retrieval when the LWD tool 400 is removed from the well during intermissions in drilling operations. In other examples, the sensor component 122 of the LWD tool 400 may transmit data about the wellbore to the surface 110 using mud pulse telemetry ("MPT").

The MEM reader 402 can be any reader for detecting MEM devices (e.g., an RFID tag reader). The MEM reader may also detect a group of MEM devices in the wellbore 102 after a sweep is injected into the wellbore 102 and returns to the surface 110 of the wellbore. The MEM reader 402 may also detect an amount and types of MEM devices in a group of MEM devices. In other examples, The MEM reader 402 may also detect a concentration of an amount and types of MEM devices in the wellbore 102. The MEM reader 402 can be positioned within the sensor component 122 of the LWD tool 400 for detecting MEM devices in the wellbore 102.

In some examples, a quantity and types of MEM devices may be placed in a sweep for a wellbore that is losing fluid. In other examples, the sweep may also contain LCM for well treatment. The LWD tool 400 along with a MEM reader 402 may be run down the wellbore 102 for detecting individual MEM devices or a group of MEM devices in the wellbore. In some examples, the MEM reader 402 may detect a group 300, 302, 304, or 306 of MEM devices. The MEM reader may also detect an amount and types of MEM devices in the groups 300, 302, 304, 306. The MEM reader 402 may also detect a position, in the wellbore 102, of the individual MEM devices or group 300, 302, 304, or 306 of MEM devices. In other examples, the MEM reader 402 may also detect a concentration of an amount and types of MEM devices in the wellbore 102. The LWD tool 400 may track the location or drilling depth within the wellbore 102 where the MEM reader 402 detects individual MEM devices or a group of MEM devices. The LWD tool 400 may also track the depth within the wellbore 102 where the MEM reader 402 detects a concentration of an amount and types of MEM devices in the wellbore 102.

In some other examples, the MEM devices placed in the sweep for the wellbore may be different sizes, shapes, and densities. The MEM reader 402 may detect individual MEM devices in a group of MEM devices and store data that may be representative of a distribution of the amount and types of MEM devices of different sizes and shapes in the group. The distribution may correspond to the amount of each type of MEM device of a different size or shape in a group of MEM devices. The MEM reader may transmit data representing this distribution to a computing device.

A computing device 404 may transmit to and receive data from the MEM reader 402 and the LWD tool 400. The MEM reader 402 can transmit data to the computing device 404 via wired communication link 406. The data may represent a position, an amount, and types of MEM devices in the wellbore. The MEM reader 402 can also transmit data indicating a group of MEM devices correlated with a wellbore position. In other examples, the MEM reader 402 may transmit other data to the computing device, the data representing the amount of MEM devices per type in a group of MEM devices. The MEM reader 402 may transmit other data to the computing device, the data indicating a size and shape of an amount and types of MEM devices at position in the wellbore. The LWD tool 400 may transmit data to the computing device 404 via the wired communication link 406. The data may represent the depth within the wellbore where the MEM reader detects a group of MEM devices. In other examples, the LWD tool may transmit other data to the computing device, the data representing the location in the wellbore where the MEM reader detects the amounts and types of MEM devices in the wellbore. In other examples, the LWD tool 400 may transmit this data to the surface 110 using MPT.

Figure 5:
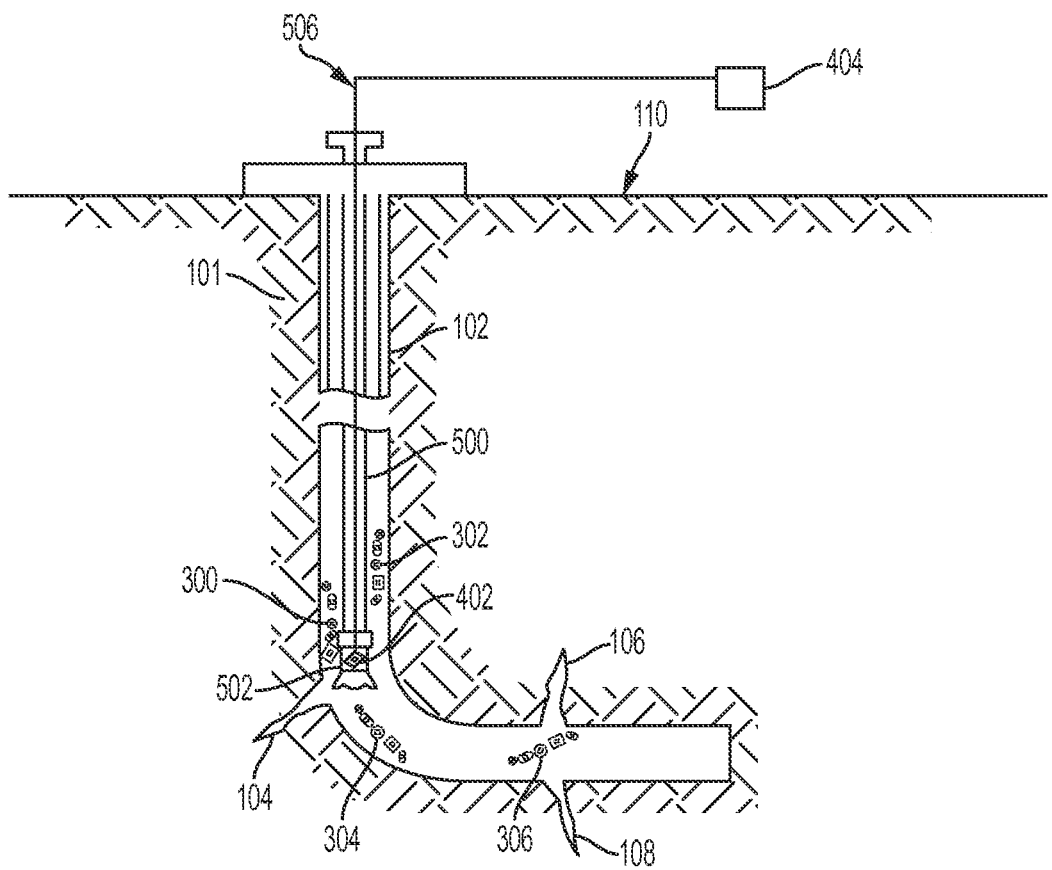
FIG. 5 is a schematic diagram of a wellbore with fractures, and groups of MEM devices, along with a measuring-while-drilling ("MWD") tool, a MEM reader, and a computing device according to one example of the present disclosure.

Other examples of a system for determining a location of a fracture in a wellbore can use an MWD tool. For example, FIG. 5 is a schematic diagram of a wellbore 102 with fractures and groups of MEM devices, along with an MWD tool 500, a MEM reader 402, and a computing device 404 according to one example of the present disclosure.

In this example, the MWD tool 500 can be any type of measurement tool that can be used to measure features of a wellbore 102 during drilling operations. For example, the MWD tool 500 can be a measurement tool for measuring the direction of wellbore 102 or inclination of the wellbore 102 from vertical. The MWD tool 500 can also include a sensor component 502 that can be used to measure the trajectory of the wellbore 102 as it is drilled. In other examples, the MWD tool 500 can be used to measure natural gamma ray emission from subterranean formation 101 through which the wellbore 102 is formed. The MWD tool 500 may also be used to obtain and transmit data about the progress of the drilling operation on the wellbore 102 (e.g., rate of penetration, the weight on a drill bit, etc.) The MWD tool 500 may also be used for tracking and storing data corresponding to the depth of the wellbore 102 or the depth or location of the MWD tool within the wellbore 102.

In some examples, a MEM reader 402 may be positioned within the sensor component 502 of the MWD tool 500 for detecting MEM devices in the wellbore 102. The MWD tool 500 along with a MEM reader 402 may be run down the wellbore 102 for detecting individual MEM devices or a group of MEM devices at a position in the wellbore. In some examples, the MEM reader 402 may detect a group 300, 302, 304, or 306 of MEM devices. The MEM reader may also detect an amount and types of MEM devices in the groups 300, 302, 304, 306. The MEM reader 402 can transmit this data to a computing device 404 via a wired communication link 506. The MWD tool 500 may track the location or depth within the wellbore 102 where the MEM reader 402 detects individual MEM devices or a group of MEM devices. The MWD tool 500 may transmit this data to the computing device 404 via the wired communication link 506. In other examples, the MWD tool 500 may transmit data to the surface 110 using MPT.

Figure 6:
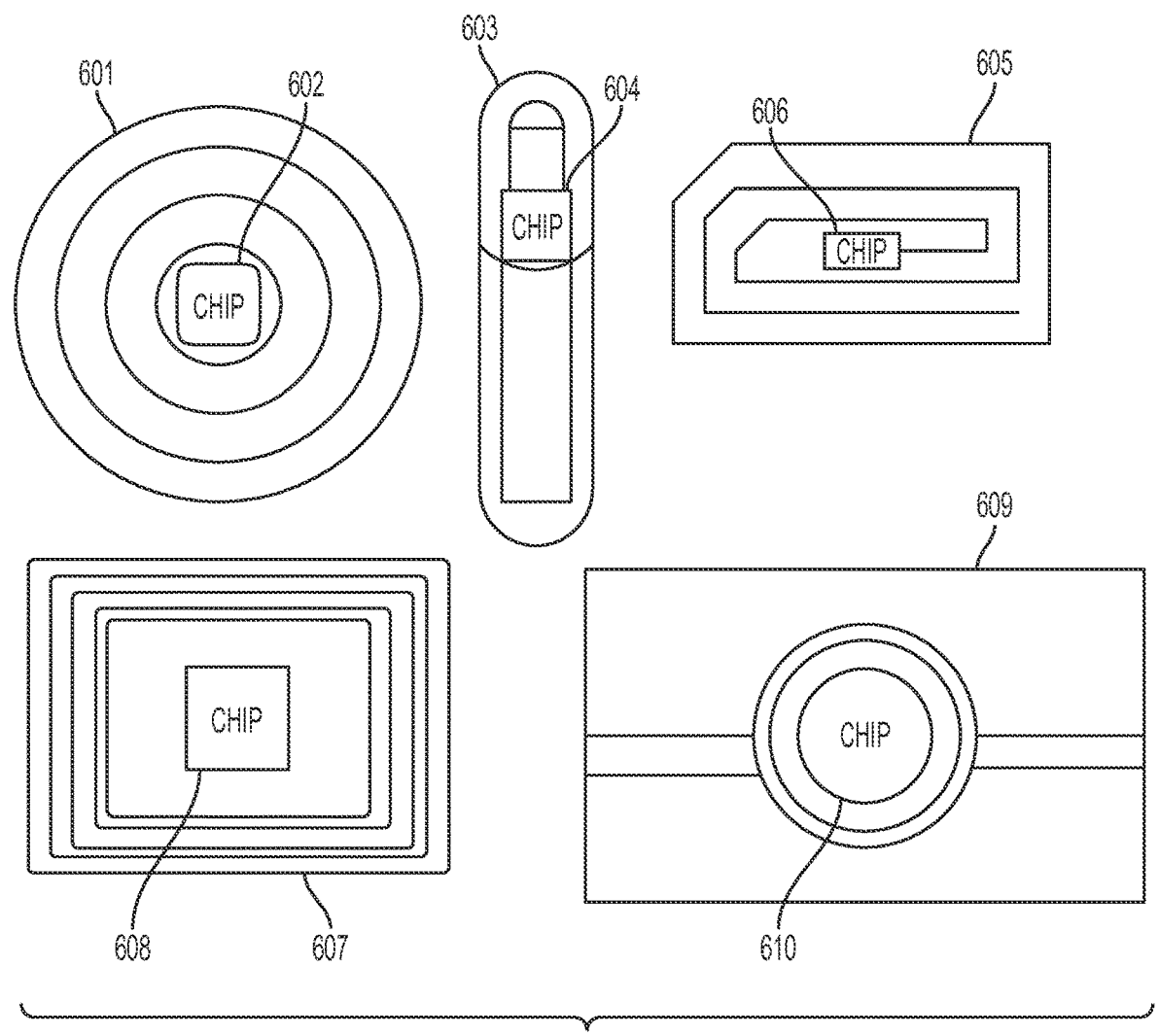
FIG. 6 is a schematic diagram of a top view of different sized and shaped MEM devices according to one example of the present disclosure.

FIG. 6 is a schematic diagram of a perspective top view of MEM devices of various sizes and shapes according to one example of the present disclosure. The MEM devices may be disposable in a sweep for a wellbore.

In some examples, MEM devices used may be of any shape. The shape of a MEM device may refer to the external form, appearance or structure of the MEM device. For example, MEM device 601 has a shape that is generally circular or round. In some examples, the shape of a MEM device embedded in a fracture in the wellbore may be representative of the shape of the fracture.

MEM devices used in some examples may be of any size. The size of a MEM device may correspond to the dimensions of a shape of the MEM device. The size of a MEM device may be measured by the area, perimeter, circumference, diameter, length cross-section, or the like, of the shape of the MEM device. For example, the sizes of MEM devices 605, 607, 609 may be measured by the area or perimeter of the MEM devices' generally rectangular shapes. In another example, the size of MEM device 603 may be measured by the length of the MEM device's generally cylindrical shape. In some examples, the size of a MEM device embedded in a fracture in the wellbore may be representative of the size or depth of the fracture.

The MEM devices may also be of any density. The density of a MEM device may refer to the volumetric mass density or mass per unit volume of the MEM device. The density of a MEM device may depend on any number of factors including, without limitation, the size of the MEM device, the shape of the MEM device, the components of the MEM device, the material used for manufacturing the MEM device, and other factors. For example, a MEM device can have mechanical (e.g., levers, springs, vibrating structures, etc.), electrical (e.g., circuits, resistors, capacitors, inductors, etc.) and electro-mechanical components that range in size and affect the density of the MEM device. The MEM devices can also have sensors, actuators, and microelectronics. The MEM devices may also be manufactured from various materials, including, without limitation, silicon, polymers (e.g., poly(methyl methacrylate)), metals (e.g., copper, aluminum, titanium, etc.) ceramics, or other material, which may affect the density of the MEM device. For example, a MEM device manufactured using silicon may have a density of silicon (e.g., approximately 2.3 g/cm$^3$).

The MEM devices 601, 603, 605, 607, 609 may also include, or have components integrated onto, a microchip or chip 602, 604, 606, 608, 610, respectively, for storing data. For example, the MEM devices may be devices with RFID tags that use electromagnetic fields to transfer data that may be used to automatically identify RFID tags and track the position of the RFID tags. The MEM devices can also communicate with and be detected by MEM readers. In some examples, the MEM devices may communicate with and be detected by MEM readers within proximity from the MEM devices.

Figure 7:
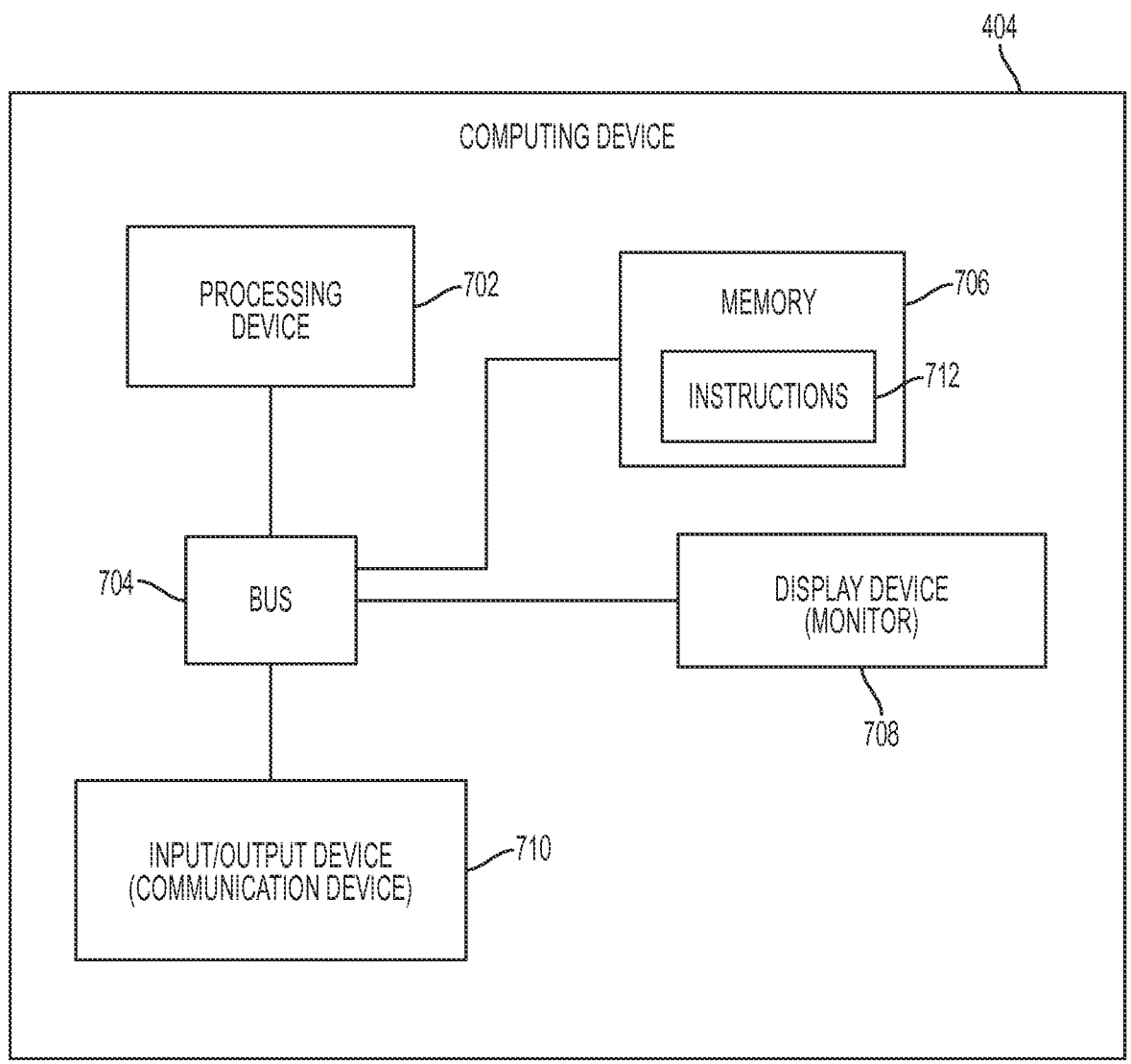
FIG. 7 is a block diagram of an example of a computing device for determining a location of a fracture in a wellbore according to one example of the present disclosure.

FIG. 7 is a block diagram of an example of a computing device 404 for determining a location of a fracture in a wellbore according to one example of the present disclosure.

The computing device 404 can include a processing device 702 interfaced with other hardware via a bus 704. The computing device 404 may also include a memory device 706. In some examples, the computing device 404 can include input/output interface components (e.g., a display device 708, a communication device 710). The computing device 404 can also include other input/output interface components such as a keyboard, touch-sensitive surface, mouse and additional storage.

The computing device 404 can receive data from a MEM reader or a downhole tool via a communication device 710. In some examples, the communication device 710 can represent one or more of any components that facilitate a network connection. In some examples, the communication device 710 may be wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). In another example, the communication device 710 can be wired and can include interfaces such as Ethernet, USB, IEEE 1394, or a fiber optic interface.

The processing device 702 can include one processing device or multiple processing devices. The processing device 702 can execute one or more operations for determining a location of a fracture in a wellbore.

The processing device 702 can execute one or more operations for determining a position of MEM devices in the wellbore based on data detected by a MEM reader. The processing device may also execute operations for determining a position of a group of MEM devices based on data detected by the MEM reader. In certain examples, the position of the MEM devices in the wellbore can be representative of a location of a fracture in the wellbore, the processing device 702 can execute one or more operations for generating data for determining the location of a fracture in the wellbore using data transmitted from the MEM reader. The operations may also be executed for outputting data for determining a location of the fracture in the wellbore using data transmitted from the MEM reader.

In another example, the processing device 702 can execute one or more operations for generating data representing a group of MEM devices in the wellbore at a wellbore position. The data may indicate the group of MEM devices correlated with the wellbore position for determining the location of a fracture in the wellbore based on the presence of the group of MEM devices at the wellbore position. The processing device 702 may also execute one or more operations for generating and outputting data representing groups of MEM devices in the wellbore at various wellbore positions. The data may indicate the groups of MEM devices correlated with the wellbore positions for determining locations of a distribution of fractures in the wellbore based on the presence of the groups of MEM devices at the wellbore positions.

The processing device 702 can also execute one or more operations for generating a distribution of the sizes and shapes of the types of MEM devices detected at a wellbore position, the distribution including a number of MEM devices per type. In certain examples, the shapes and sizes of the MEM devices at a position in the wellbore may be representative of the shape and size of a fracture in the wellbore. The operations can be executed for outputting data about the number of MEM devices per type for determining a size, shape, and type of the fracture.

In some other examples, the processing device 702 can execute one or more operations for generating and outputting a distribution of the amount and types of MEM devices in a group of MEM devices for determining an amount and types of lost circulation material ("LCM") to be used in a further sweep subsequently injected into the wellbore. The processing device 702 can also execute one or more operations for outputting data for determining remedial actions for well planning.

In some examples, the computing device 404 can also be communicatively coupled to a display device 708 via the bus 704. The display device can display data that may correspond to data received by the computing device 404 from a MEM reader or a downhole tool. The display device may also display data that may correspond to data generated by executing an operation executed by the processing device 702.

The processing device 702 can also be communicatively coupled to the memory device 706 via the bus 704. The non-volatile memory device may include any type of memory that retains stored information when powered off. Non-limiting examples of the memory device 706 include EEPROM, flash memory, or any other type of non-volatile memory. In some examples, at least some of the memory device 706 can include a medium from which the processing device can read instructions 712. A computer-readable medium can include electronic, optical, magnetic, or other storage devices capable of providing the processing device 702 with computer-readable instructions or other program code. Non-limiting examples of a computer-readable medium include, but are not limited to, magnetic disks, memory chips, read-only memory ("ROM"), random-access memory ("RAM"), an ASIC, a configured processor, optical storage, or any other medium from which a computer processor can read instructions.

Figure 8:
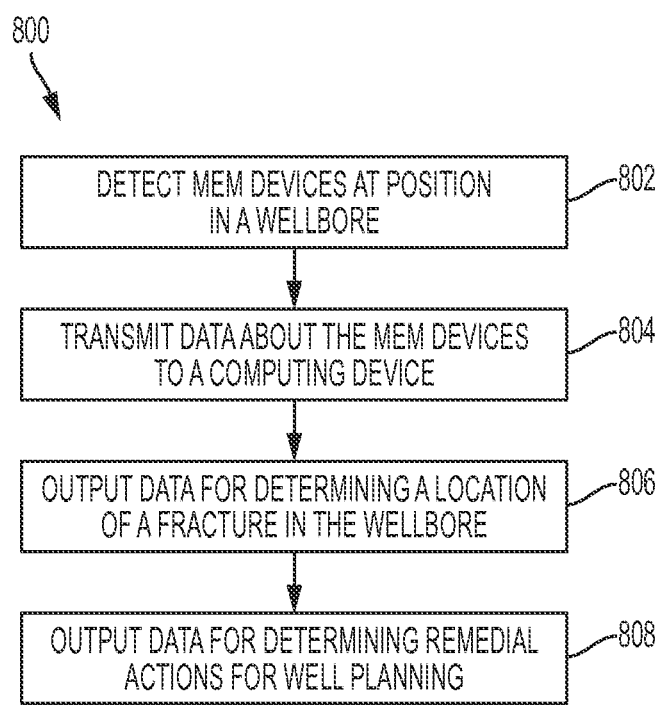
FIG. 8 is a flow chart of an example of a process for determining a location of a fracture in a wellbore according to one example of the present disclosure.

FIG. 8 is a flow chart of an example of a process 800 for determining a location of a fracture in a wellbore.

In block 802, MEM devices at a position in a wellbore are detected. In some examples, a sweep containing MEM devices is injected into a wellbore. The sweep and the MEM devices can be injected into a wellbore that is losing fluid. The MEM devices in the sweep may be of various sizes, shapes and densities. In other examples, the sweep can also include LCM for well treatment. The MEM devices or LCM may be disposable in the sweep in any manner, including without limitation, through manual disposal (e.g., manual labor) or through automated disposal (e.g., by an apparatus, device, machine, or the like). A downhole tool, (e.g., an LWD tool, an MWD tool, or a wireline) along with a MEM reader, can be run down hole to detect the MEM devices in the wellbore.

The MEM reader may detect individual MEM devices at a position in the wellbore after the sweep is injected into the wellbore and exits the wellbore. The MEM reader may also detect an amount and types of MEM devices in the wellbore. The MEM reader may detect the individual MEM through a communication link. In some examples, the communication link may be any link that facilitates communication between the individual MEM devices and the MEM reader. The communication link may be wireless and can included wireless interfaces.

In some examples, identification and tracking information for each MEM devices may be stored on a microchip on the MEM device. The MEM reader may detect the information for each MEM device in the wellbore through the communication link. The information may be used for determining a position, amount, and types of the MEM devices in the wellbore.

In another example, the MEM reader may detect MEM devices in the wellbore through electromagnetic fields and energy. The MEM devices may be devices with RFID tags. The MEM reader may be an RFID reader. Identification and tracking data may be stored within a microchip on the MEM devices. The MEM devices may transmit signals, through an electromagnetic field, to the MEM reader. The MEM reader may detect the MEM devices in the wellbore by detecting the signals and interpreting the identification and tracking data stored on the MEM devices. The identification and tracking data may be used for determining a position, amount, and types of the MEM devices in the wellbore.

The MEM reader may also detect individual MEM devices and store data that may be representative of a distribution of the amount and types of MEM devices of different sizes and shapes in the wellbore.

In other examples, any reader for detecting or sensing MEM devices may detect the MEM devices remaining in the wellbore after a sweep with MEM devices is injected into the wellbore and returns to the surface of the wellbore.

The downhole tool may track the drilling depth of the downhole tool and MEM reader for determining the location in the wellbore where the MEM reader detects MEM devices. In some examples, the downhole tool may include sensors for measuring the physical properties of the wellbore. For example, the sensors on the downhole tool may be used for tracking and storing data corresponding to the depth of the wellbore or the location of the downhole tool within the wellbore.

In other examples, the drilling depth of the downhole tool and MEM reader may be tracked using any method for determining the depth or location within the wellbore where the MEM reader detects MEM devices.

In block 804, data about the MEM devices is transmitted to a computing device. In some examples, a MEM reader may transmit data to a computing device. The data may represent a position, an amount, and types of MEM devices in the wellbore. In other examples, the data may represent a group of MEM devices in the wellbore at a position in the wellbore. In other examples, the data may represent a size and shape of the amount and types of MEM devices in the wellbore. The MEM reader may transmit other data that represents a distribution of the types of MEM devices detected in the wellbore, the distribution including a number of MEM devices per type at a position in the wellbore.

A downhole tool may also transmit data to the computing device. The data may represent drilling depth within the wellbore. In other examples, the downhole tool may transmit data representing the downhole tool and MEM reader's position in the wellbore. The downhole tool may also transmit other data, the other data may represent a position within the wellbore where the MEM reader detects MEM devices. The downhole tool may also transmit data representing a location in the wellbore where the MEM reader detects the amounts and types of MEM devices in the wellbore.

In block 806, data is outputted for determining a location of a fracture in the wellbore. The data may be based on data transmitted to the computing device from a MEM reader. The computing device may output data about the location of individual MEM devices or a group of MEM devices for determining the location of a fracture in the wellbore. In some examples, the position of MEM devices in the wellbore may correspond to the location of the fracture in the wellbore.

In block 808, data is outputted for determining remedial actions for well planning. For example, a computing device may output data for determining an amount and types LCM to be used in a subsequent sweep. The LCM may be any lost circulation material for well treatment. In certain examples, the amount and types of MEM devices in a group of MEM devices may be representative of the amount and types of LCM to be used in a subsequent sweep for treating a fracture in the wellbore. In other examples, the computing device may also output data for determining a distribution of fractures located in the wellbore. The data may be representative of groups of MEM devices in the wellbore at various positions within the wellbore. The data may indicate the groups of MEM devices correlated with the wellbore positions for determining locations of a various fractures in the wellbore based on the presence of MEM devices at the wellbore positions.

Figure 9:
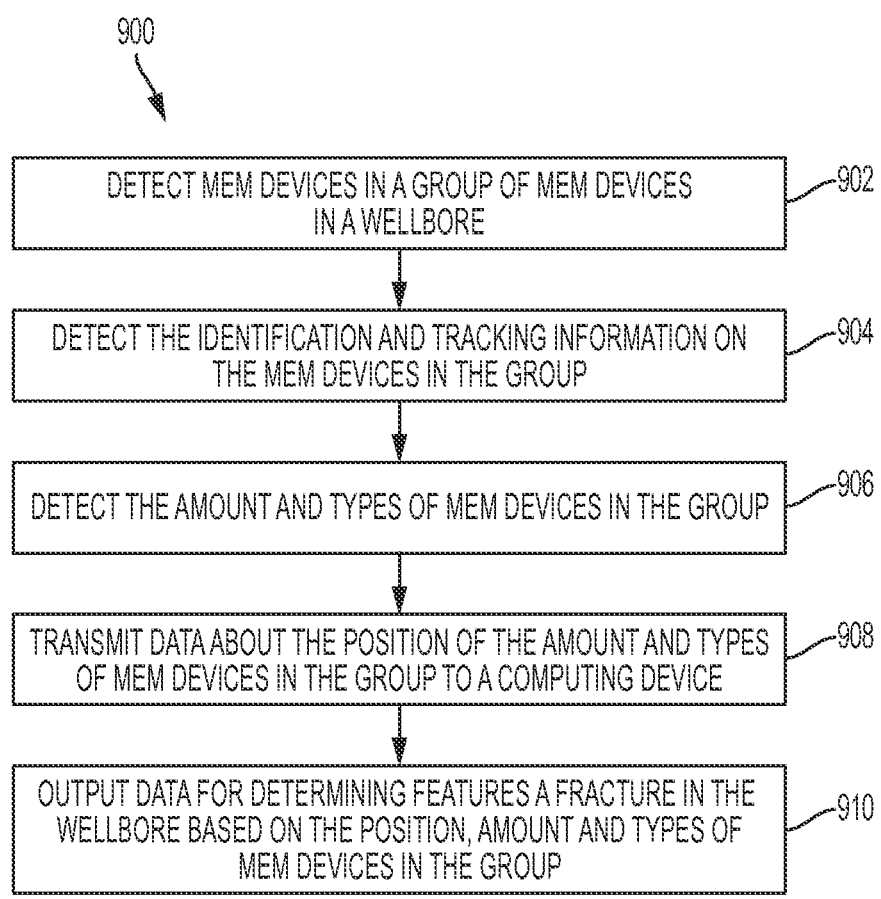
FIG. 9 is a flow chart of an example of a process for determining features of a fracture in a wellbore according to one example of the present disclosure.

FIG. 9 is a flow chart of an example of a process 900 for determining features of a fracture in a wellbore according to another example of the present disclosure.

In block 902, MEM devices in a group of MEM devices in a wellbore are detected. In some examples, a MEM reader on a downhole tool may detect a group of MEM devices in the wellbore. In other examples, the MEM reader may detect individual MEM devices in the wellbore to detect a group of MEM devices at a wellbore position.

In block 904, identification and tracking information on the MEM devices in the group is detected. In some examples, a MEM reader may detect identification and tracking information stored on a microchip on each MEM device in the group through a communication link. The information for each MEM device may contain data that can be used to detect the position of the group of MEM devices within the wellbore.

In block 906, the amounts and types of MEM devices in the group are detected. In some examples, a MEM reader may detect identification information for each MEM device in a group of MEM devices through a communication link. The identification information for each MEM device may contain data that can be used to detect the size and shape of the MEM devices in the group.

In block 908, data about the position of the amount and types of MEM devices in the group is transmitted to a computing device. In some examples, a MEM reader may transmit data about the position, amount and types of MEM devices in the group of MEM devices to the computing device. The data may indicate individual MEM devices or a group of MEM devices correlated with a wellbore position. The data may be used for determining a location of a fracture in the wellbore based on the presence of the MEM devices at the wellbore position.

In block 910, data for determining features of a fracture in the wellbore based on the position, amount, and types of MEM devices in the group is outputted. In some examples, a computing device may output data for determining a location of a fracture in the wellbore. The computing device may output data about the position of the group of MEM devices in the wellbore for determining a location of a fracture in the wellbore. In some examples, the position of a group of MEM devices in the wellbore may correspond to a location of a fracture in the wellbore.

In other examples, the computing device may output data for determining a size, shape or type of a fracture in the wellbore. The computing device may generate a distribution including a number of MEM devices per type in a group of MEM devices in the wellbore. The computing device may output this data for determining a size, shape, or type of a fracture in the wellbore. In some examples, the sizes and shapes of the MEM devices in the group may be representative of a size or shape of a fracture in the wellbore. In other examples, the distribution of the number of MEM devices per type in a group of MEM devices may be representative of the type of fracture (e.g., a naturally occurring fracture or an induced fracture).

In some aspects, systems and methods for detecting MEM devices embedded in a fracture in a wellbore that is losing fluid are provided according to one or more of the following examples:

Example #1: A method can include detecting, by a MEM reader in a wellbore, MEM devices in the wellbore subsequent to a sweep exiting the wellbore. The sweep can contain MEM devices of different sizes and shapes. The method can also include transmitting data representing a position, an amount, and types of MEM devices in the wellbore to a computing device for determining a location, size, and shape of a fracture in the wellbore based on the data.

Examples #2: The method of Example #1 may feature detecting the MEM devices in the wellbore including detecting a group of MEM devices in the wellbore at a wellbore position. The data can indicate the group of MEM devices correlated with the wellbore position for determining the location of the fracture in the wellbore based on the presence of the group of MEM devices at the wellbore position.

Example #3: The method of any of Examples #1-2 may feature detecting the MEM devices including running a downhole tool that includes the MEM reader into the wellbore.

Example #4: The method of any of Examples #1-3 may feature detecting the MEM devices in the wellbore including detecting, by the MEM reader, identification information on the MEM devices in the wellbore for determining the position and types of MEM devices at a wellbore position.

Example #5: The method of any of Examples #1-4 may feature transmitting data representing the position of the MEM devices in the wellbore including transmitting data to the computing device. The data can represent a depth of the MEM reader in the wellbore. The depth can correspond to a wellbore position where the MEM reader detects MEM devices.

Example #6: The method of any of Examples #1-5 may feature transmitting data representing the position, amount, and types of MEM devices including transmitting data from the MEM reader to the computing device. The data can represent a size and shape of the amount and types of MEM devices at a wellbore position for determining a size, shape, and type of the fracture.

Example #7: The method of any of Examples #2-6 may feature transmitting the position, amount, and types of MEM devices including transmitting data representing a distribution of the types of MEM devices in the group. The distribution can include a number of MEM devices per type in the group. The data can be used for determining an amount and types of lost circulation material to be used in a further sweep subsequently injected into the wellbore.

Example #8: A system can include MEM devices of different sizes and shapes. The MEM devices can be disposable in a sweep injected into a wellbore. The system can also include a MEM reader positioned in the wellbore by a downhole tool. The MEM reader can be detect MEM devices at a position in the wellbore subsequent to the sweep returning to a surface of the wellbore. The system can also include a processing module communicatively coupled to the MEM reader for receiving data. The data can represent a position, an amount, and types of the MEM devices in the wellbore for determining a location, size, and shape of a fracture in the wellbore based on the data.

Example #9: The system of Example #8 may feature the downhole tool being a measuring-while-drilling tool, a logging-while-drilling tool, or a wireline.

Example #10: The system of any of Examples #8-9 may feature the MEM reader being positioned in the wellbore for detecting a group of MEM devices in the wellbore at a wellbore position.

Example #11: The system of any of Examples #8-10 may feature the MEM reader being positioned in the wellbore for detecting identification information on the MEM devices in the wellbore for determining the position and types of MEM devices at a wellbore position.

Example #12: The system of any of Examples #8-11 may feature the downhole tool being positioned in the wellbore for tracking drilling depth for determining a wellbore position where the MEM reader detects the MEM devices.

Example #13: The system of any of Examples #8-12 may feature the processing module being communicatively coupled to the MEM reader for receiving data indicating a group of MEM devices correlated with the wellbore position. The data can be used for determining the location of the fracture in the wellbore based on the presence of the group of MEM devices at the wellbore position.

Example #14: The system of any of Examples #8-13 may feature the processing module being communicatively coupled to the MEM reader for receiving data indicating a size and shape of the amount and types of the MEM devices correlated with the wellbore position. The data can be used for determining a size, shape, and type of the fracture in the wellbore based on the presence of the amount and types of MEM devices at the wellbore position.

Example #15: A non-transitory computer-readable storage medium having programmed code that is executable by a processing device to cause a computing device to perform operations. The operations can include generating data for determining a location of a fracture in a wellbore using data transmitted from a MEM reader. The data can represent a position, an amount, and types of MEM devices in the wellbore. The operations can also include outputting data for determining the location of the fracture in the wellbore using the data transmitted from the MEM reader.

Example #16: The storage medium of Example #15 may feature the operation of outputting data further including operations for outputting data about the position of an amount and types of MEM devices in the wellbore. The position of the MEM devices can correspond to the location of the fracture in the wellbore.

Example #17: The storage medium of any of Examples #15-16 may feature the operation of generating data further including operations for generating data representing a group of MEM devices in the wellbore at a wellbore position. The data can indicate the group of MEM devices correlated with the wellbore position. The data can be used for determining the location of the fracture in the wellbore based on the presence of the group of MEM devices at the wellbore position.

Example #18: The storage medium of Example #15-17 may feature the operation of outputting data further including operations for outputting data representing groups of MEM devices in the wellbore at various wellbore positions. The data can indicate the groups of MEM devices correlated with the wellbore positions. The data can be used for determining locations of a distribution of fractures in the wellbore based on the presence of the groups of MEM devices at the wellbore positions.

Example #19: The storage medium of any of Examples #15-18 may feature the operation of generating data further including operations for generating data representing a distribution of the types of MEM devices in the wellbore at a wellbore position. The distribution can include a number of MEM devices per type in the group. The data can be used for determining an amount and types of lost circulation material to be used in a further sweep subsequently injected into the wellbore.

Example #20: The storage medium of any of Examples #15-19 may feature the operation of generating data further including operations for generating data representing a size and shape of the amount and types of MEM devices in the wellbore at a wellbore position. The data can indicate the amount and types of MEM devices correlated with the wellbore position. The data can be used for determining a size, shape, and type of the fracture in the wellbore based on the presence of the amount and types of MEM devices at the wellbore position.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
   detecting, by running a measuring-while-drilling tool or a logging-while-drilling tool that includes a micro-electro-mechanical (MEM) reader into a wellbore, MEM devices in the wellbore subsequent to a MEM injecting sweep exiting the wellbore, the MEM injecting sweep containing MEM devices of different sizes and shapes; and
   transmitting data representing a position, an amount, and types of the MEM devices in the wellbore to a computing device for determining, based on the data, a location, size, and shape of a fracture causing loss of fluid in the wellbore during drilling operations.

2. The method of claim 1, wherein detecting the MEM devices in the wellbore includes detecting a group of MEM devices in the wellbore at a wellbore position, the data indicating the group of MEM devices correlated with the wellbore position for determining the location of the fracture in the wellbore based on a presence of the group of MEM devices at the wellbore position.

3. The method of claim 2, wherein transmitting data representing the position, amount, and types of MEM devices includes transmitting data representing a distribution of the types of MEM devices in the group for determining an amount and types of lost circulation material to be used in a treatment sweep subsequently injected into the wellbore, the distribution including a number of MEM devices per type in the group.

4. The method of claim 1, wherein detecting the MEM devices in the wellbore includes detecting, by the MEM reader, identification information on the MEM devices in the wellbore for determining the position and types of MEM devices at a wellbore position.

5. The method of claim 1, wherein transmitting data representing the position of the MEM devices in the wellbore includes transmitting data to the computing device, the data representing a depth of the MEM reader in the wellbore, the depth corresponding to a wellbore position where the MEM reader detects MEM devices.

6. The method of claim 1, wherein transmitting data representing the position, amount, and types of MEM devices includes transmitting data from the MEM reader to the computing device, the data representing a size and shape of the amount and types of MEM devices at a wellbore position for determining a size, shape, and type of the fracture.

7. A system comprising:
   micro-electro-mechanical ("MEM") devices of different sizes and shapes disposable in a MEM injecting sweep injected into a wellbore;
   a measuring-while-drilling tool or logging-while-drilling tool that includes a MEM reader, the MEM reader positionable in the wellbore by running the measuring-while-drilling or logging-while-drilling tool into the wellbore for detecting MEM devices at a wellbore position subsequent to the MEM injecting sweep returning to a surface of the wellbore; and
   a processing module communicatively coupled to the MEM reader for receiving data representing a position, an amount, and types of the MEM devices in the wellbore and for determining, based on the data, a location, size, and shape of a fracture causing loss of fluid in the wellbore during drilling operations.

8. The system of claim 7, wherein the MEM reader is positionable in the wellbore for detecting a group of MEM devices in the wellbore at the wellbore position.

9. The system of claim 7, wherein the MEM reader is positionable in the wellbore for detecting identification information on the MEM devices in the wellbore for determining the position and types of MEM devices at the wellbore position.

10. The system of claim 7, wherein the tool is positionable in the wellbore for tracking drilling depth for determining the wellbore position where the MEM reader detects the MEM devices.

11. The system of claim 7, wherein the processing module is communicatively coupled to the MEM reader for receiving data indicating a group of MEM devices correlated with the wellbore position for determining the location of the fracture in the wellbore based on a presence of the group of MEM devices at the wellbore position.

12. The system of claim 7, wherein the processing module is communicatively coupled to the MEM reader for receiving data indicating the size and shape of the amount and types of the MEM devices correlated with the wellbore position for determining the size, shape, and type of the fracture in the wellbore based on the presence the amount and types of MEM devices at the wellbore position.

13. A non-transitory computer-readable storage medium having program code that is executable by a processor device to cause a computing device to perform operations, the operations comprising:
   generating data for determining a location of a fracture in a wellbore using data transmitted from a micro-electro-mechanical ("MEM") reader, the fracture causing loss of fluid in the wellbore during drilling operations, the data representing a position, an amount, and a distribution of types of MEM devices in the wellbore at a wellbore position subsequent to a MEM injecting sweep for determining an amount and types of lost circulation material to be used in a further sweep subsequently injected into the wellbore, the distribution including a number of MEM devices per type in a group; and
   outputting data for determining the location of the fracture in the wellbore using the data transmitted from the MEM reader.

14. The non-transitory computer-readable storage medium of claim 13, wherein outputting data includes outputting data about the position of an amount and types of MEM devices in the wellbore, the position of the MEM devices corresponding to the location of the fracture in the wellbore.

15. The non-transitory computer-readable storage medium of claim 13, wherein generating data includes generating data representing the group of MEM devices in the wellbore at a wellbore position, the data indicating the group of MEM devices correlated with the wellbore position for determining the location of the fracture in the wellbore based on a presence of the group of MEM devices at the wellbore position.

16. The non-transitory computer-readable storage medium of claim 15, wherein outputting data includes outputting data representing groups of MEM devices in the wellbore at various wellbore positions, the data indicating the groups of MEM devices correlated with the wellbore positions for determining locations of a distribution of fractures causing loss of fluid in the wellbore during drilling operations based on a presence of the groups of MEM devices at the wellbore positions.

17. The non-transitory computer-readable storage medium of claim 13, wherein generating data includes generating data representing a size and shape of the amount and types of MEM devices in the wellbore at a wellbore position, the data indicating the amount and types of MEM devices correlated with the wellbore position for determining a size, shape, and type of the fracture in the wellbore based on a presence of the amount and types of MEM devices at the wellbore position.

* * * * *